May 31, 1932.  H. H. YERK ET AL  1,860,796
GRINDING MACHINE
Filed April 4, 1930    10 Sheets-Sheet 1

INVENTOR
Henry H. Yerk
Arthur A. Kottman
BY Evans & McCoy
ATTORNEYS

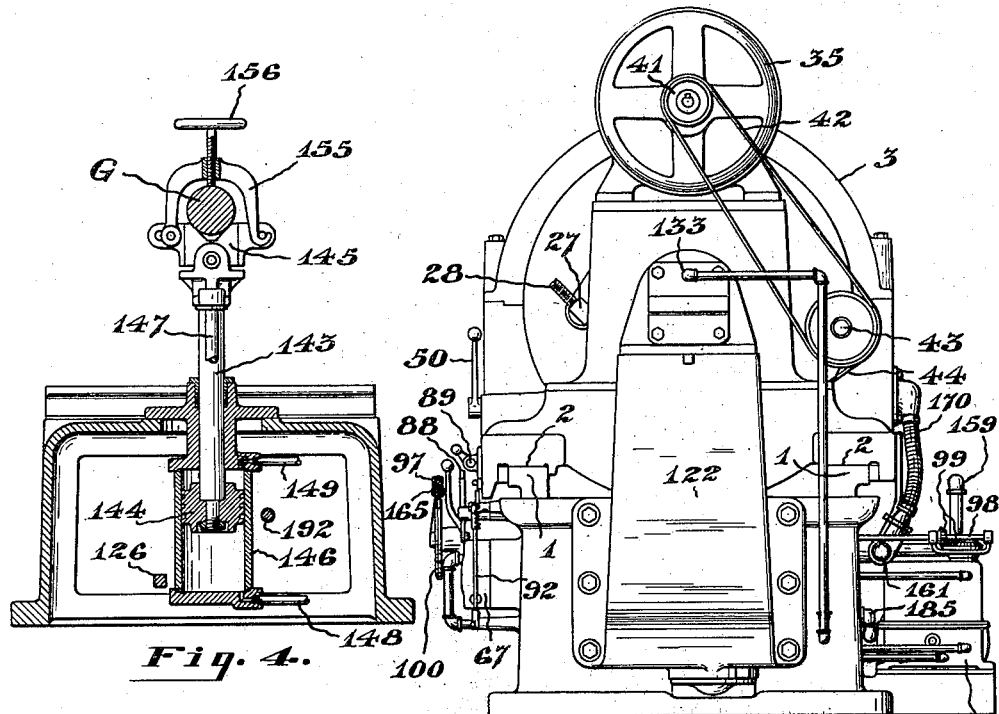
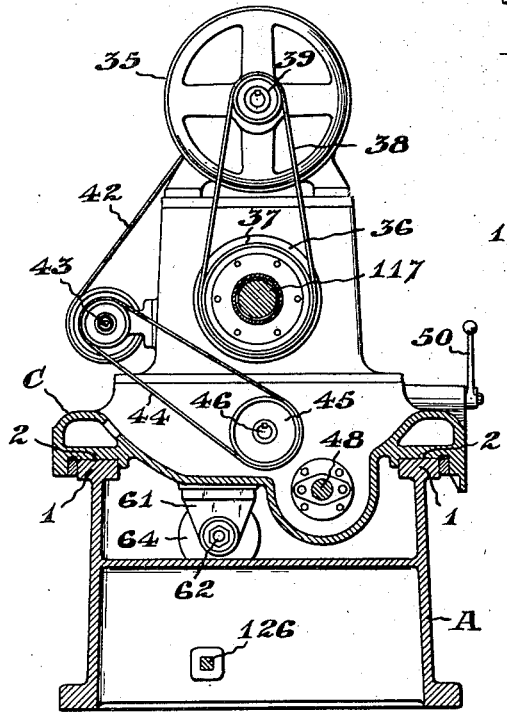
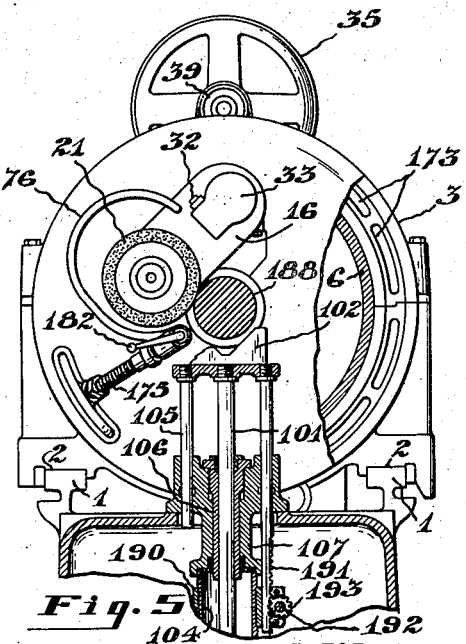

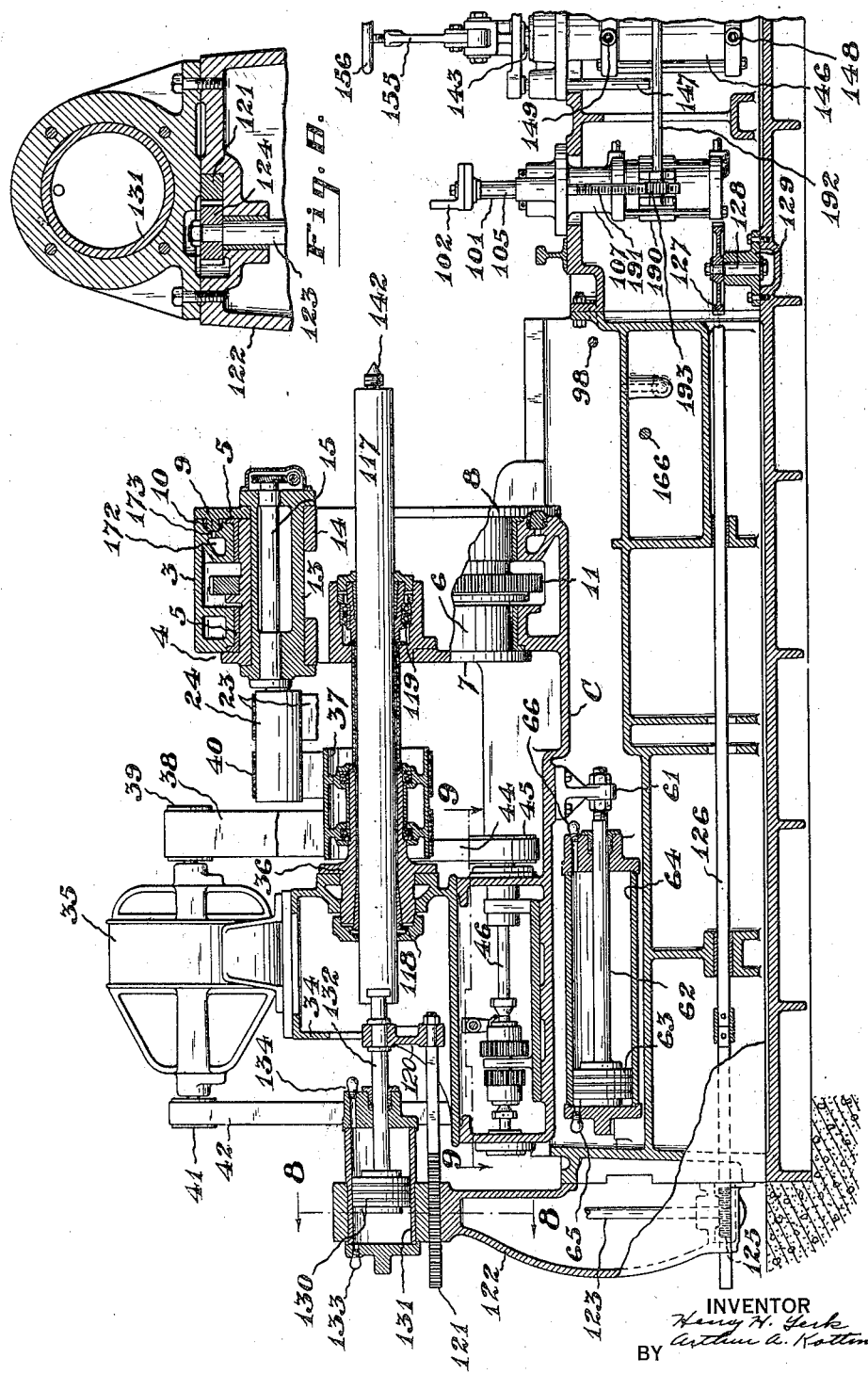

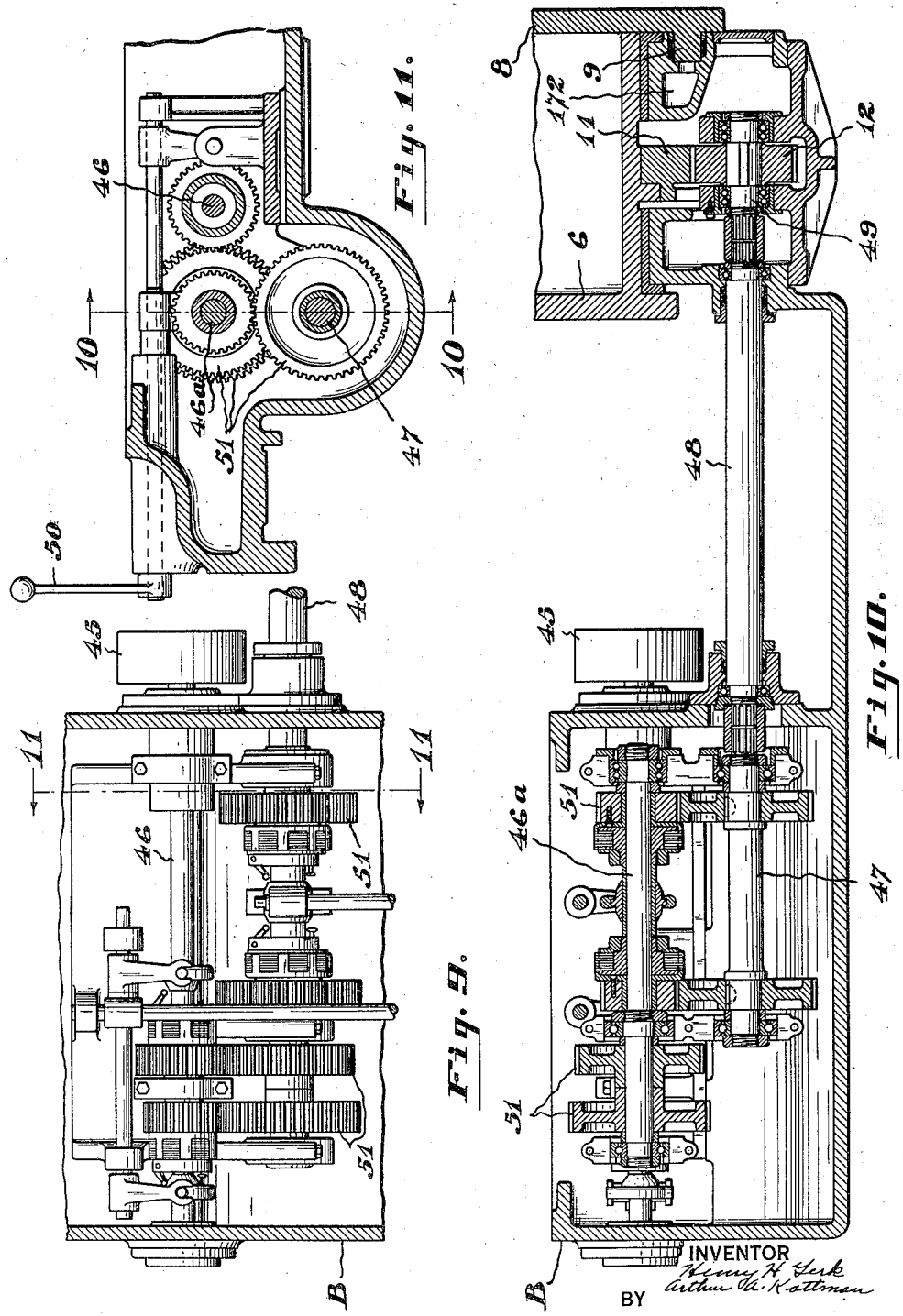

INVENTOR
Henry H. Yerk
Arthur A. Kettman
BY Evans & McCoy
ATTORNEYS

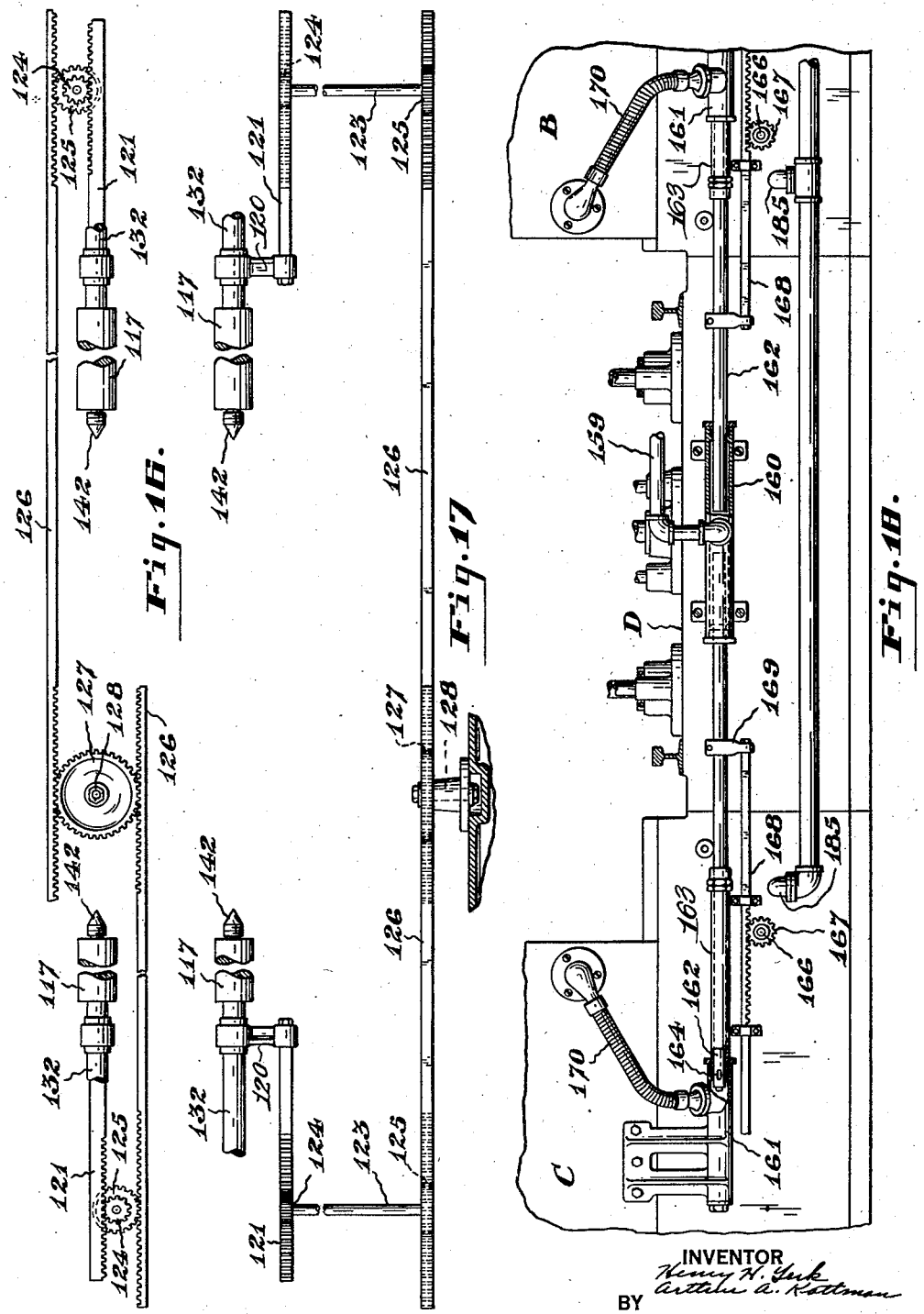

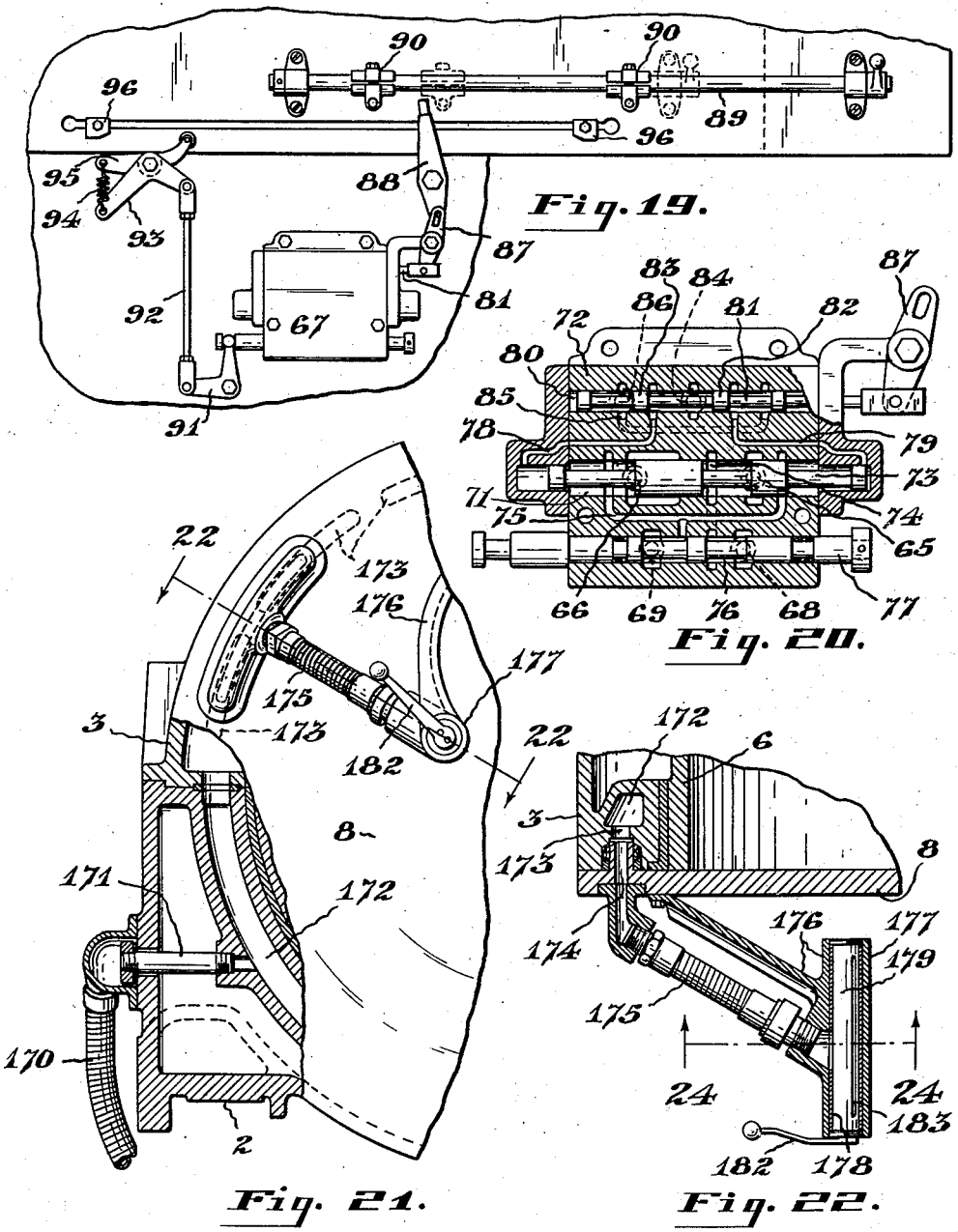

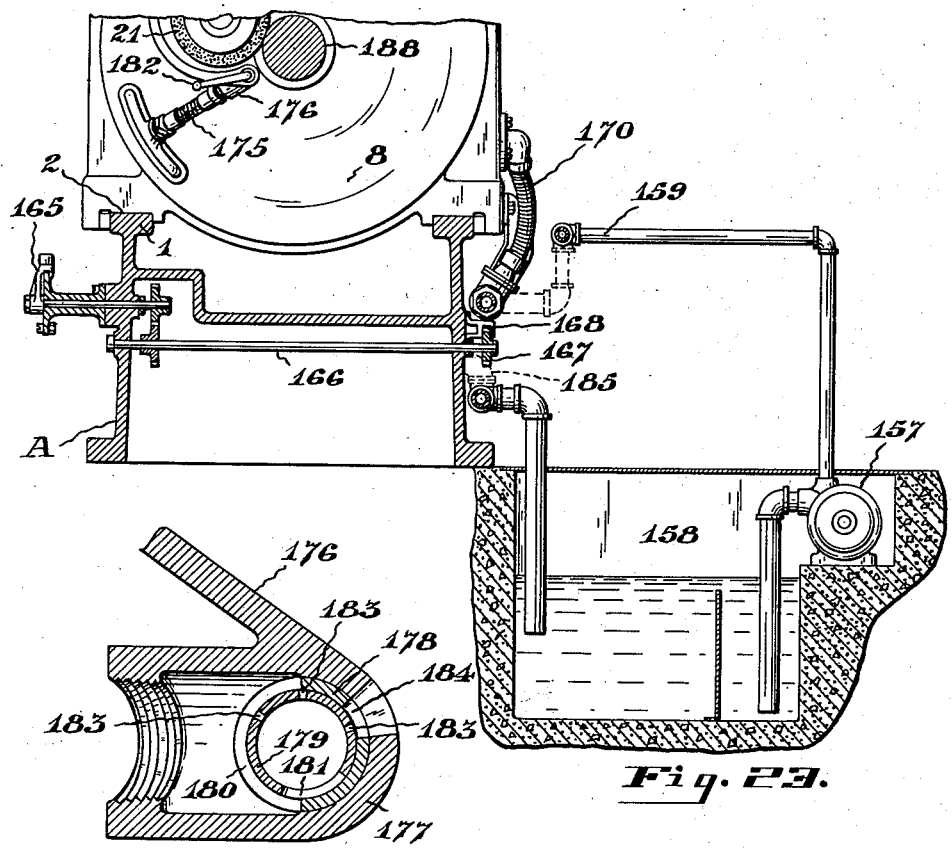
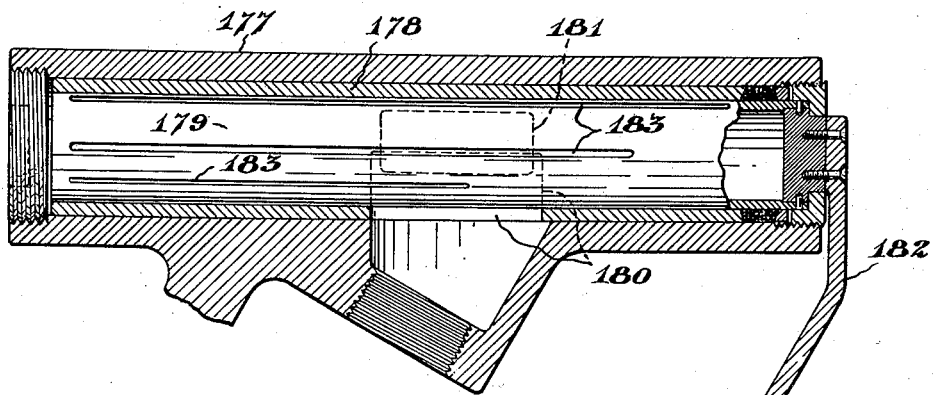

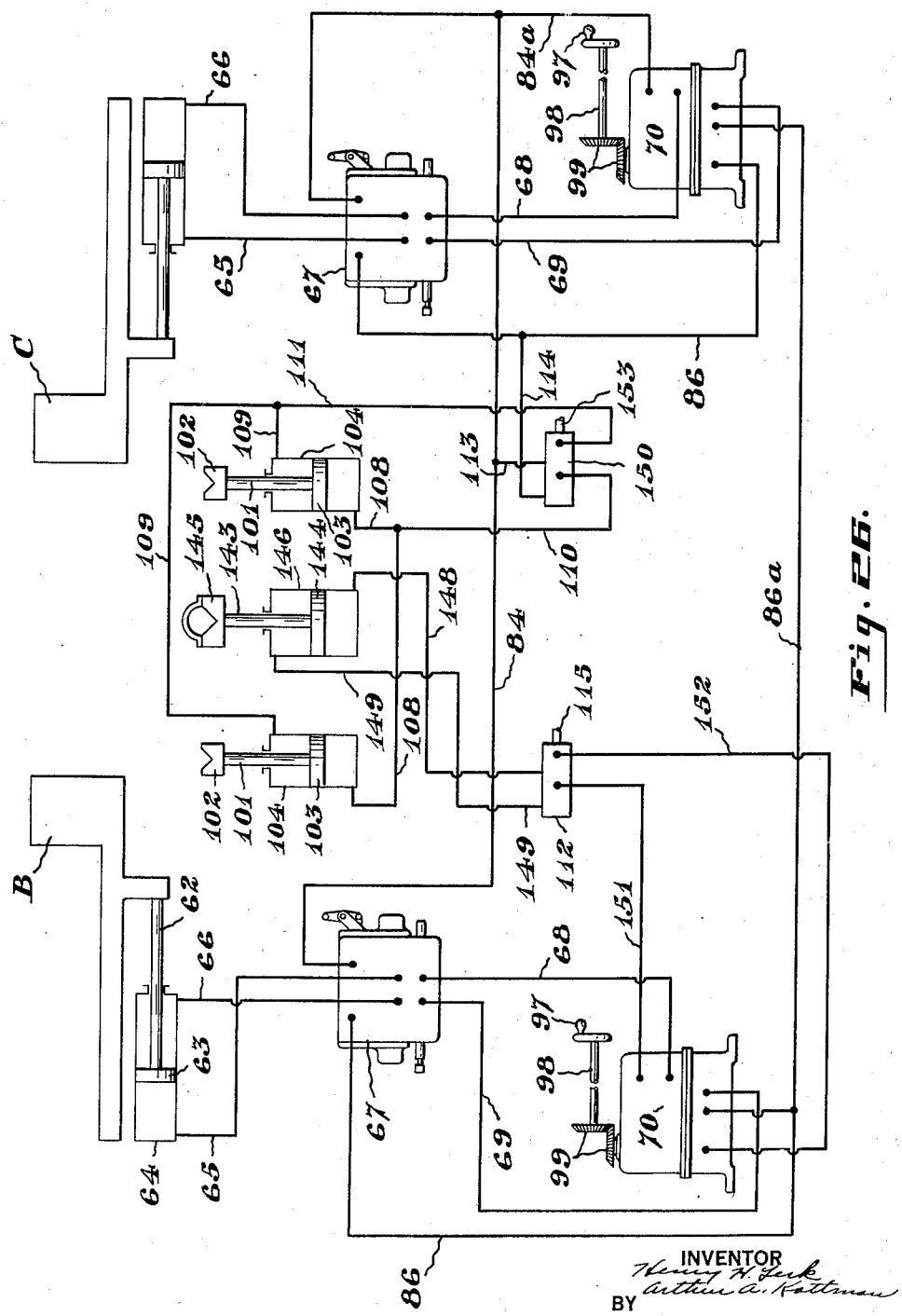

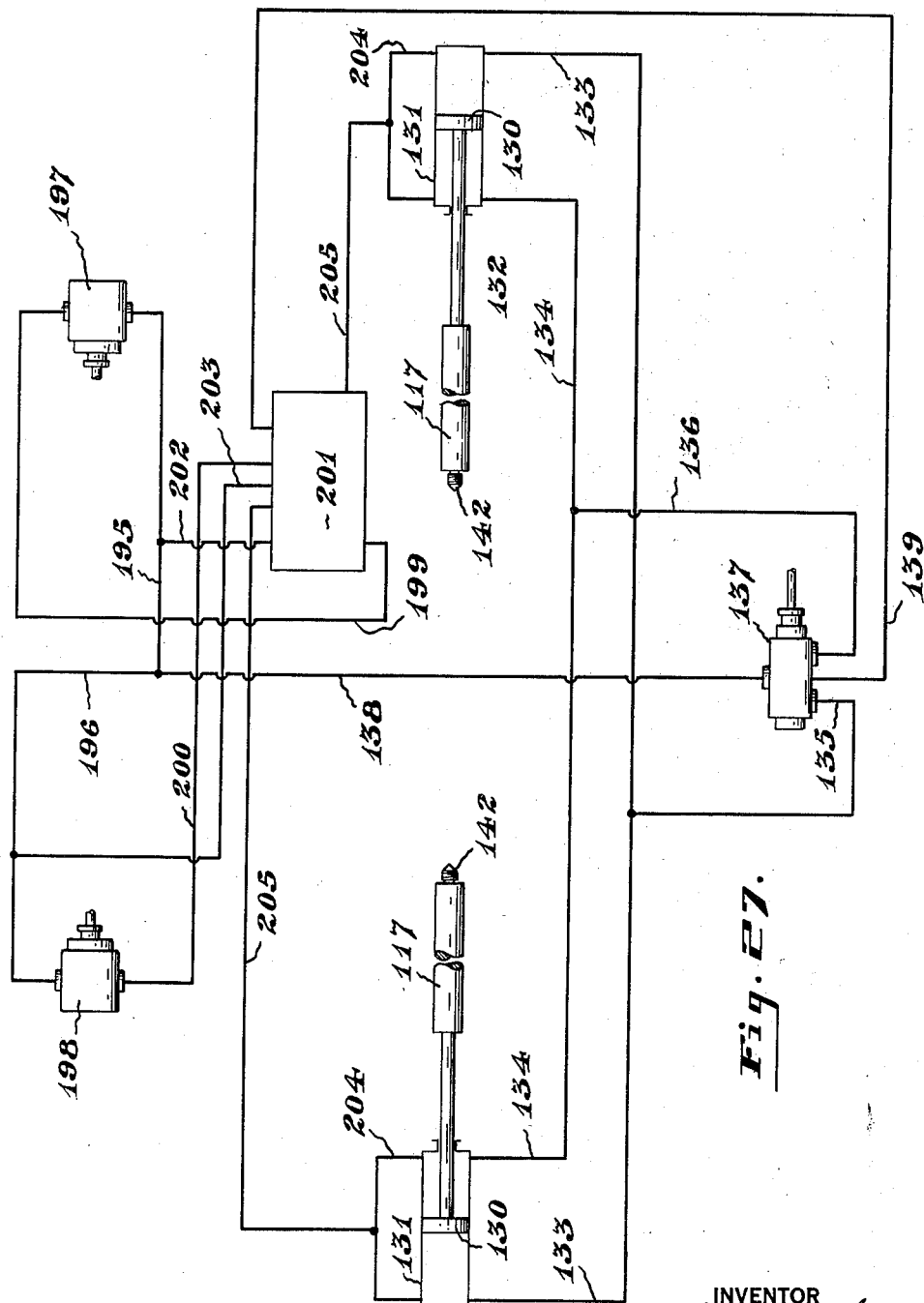

Patented May 31, 1932

1,860,796

UNITED STATES PATENT OFFICE

HENRY H. YERK AND ARTHUR A. KOTTMAN, OF DAVENPORT, IOWA, ASSIGNORS TO MICRO MACHINE COMPANY, OF BETTENDORF, IOWA, A CORPORATION OF IOWA

GRINDING MACHINE

Application filed April 4, 1930. Serial No. 441,645.

This invention relates to grinding machines and more particularly to machines for grinding railway car axles.

In grinding the wheel and journal seats of railway car axles it is very desirable to hold the axle stationary and allow the grinding wheel to travel around the cylindrical surface since, on account of the heavy mass where the work revolves, there is a slight vibration which has a tendency to cause chatter marks, surface blemishes, feed marks, etc. This is particularly noticeable when the grinding is done with the wheels mounted on the axle. It is obvious, therefore, that by holding the work stationary and rotating the grinding wheel around the surface being ground, vibrations due to unbalanced conditions will be materially lessened.

Heretofore it has been the practice to grind only one end of a railway car axle at a time, and in order to do this it was necessary to set the work up independently for each grinding operation, or to adjust the fixture carrying the work for each grinding operation. Considerable time was consumed in accurately positioning the axle, in order that the ends thereof would be presented in identically the same manner to a single grinding wheel. The element of time is materially lessened by the use of oppositely disposed grinding elements and it is one of the objects of this invention to feed both grinding elements individually or simultaneously with respect to a stationary railway car axle in which the journal or wheel seats are ground and finished from opposite ends, so that the time required for such grinding operation is reduced to a minimum.

Another object is to provide a duplex grinding machine for railway car axles in which opposed spindles can be reciprocated individually or simultaneously, or remain stationary while they are being subjected to the same or different rotary and orbital movements.

Another object is to provide a work supporting table for a car axle grinding machine which can be readily adjusted in a vertical plane to accurately position the work relative to a pair of oppositely disposed grinding wheels.

Another object is to provide a hydraulically controlled work table for centering the work relative to a pair of opposed grinding wheels.

A further object is to provide a duplex machine for grinding railway car axles in which the axle being ground is held stationary and in which the grinding wheels, while having simultaneous or independent rotary and orbital movement, are reciprocated simultaneously or independently by hydraulic means.

With the foregoing and other objects in view, which will be apparent from the detailed description to follow, the invention consists in certain novel features of construction and combinations of parts which will be readily understood by those skilled in the art to which the invention pertains.

In the drawings, which illustrate a suitable embodiment of the present invention, Figure 1 is a plan view of the duplex grinding machine showing a railway car axle mounted thereon in position for grinding, one wheel of the axle being removed;

Fig. 3 is an enlarged end elevation of the duplex grinding machine shown in Fig. 1;

Fig. 4 is an enlarged transverse section taken substantially on the line 4—4 of Fig. 2, through the hydraulic steady rest;

Fig. 5 is an enlarged section taken on the line 5—5 of Fig. 2 through one of the hydraulic mounting blocks, showing the grinding wheel in engagement with the cylindrical wheel side;

Fig. 6 is an enlarged section taken substantially on the line 6—6 of Fig. 2, showing the means for driving the headstock;

Fig. 7 is an enlarged longitudinal section taken substantially on the line 7—7 of Fig. 1, showing the hydraulic control means for reciprocating the carriage and showing the hydraulic control means for actuating the centering devices for the car axle;

Fig. 8 is a fragmentary section taken on the line 8—8 of Fig. 7, through the hydraulic cylinder for the centering device;

Fig. 9 is an enlarged section taken substantially on the line 9—9 of Fig. 7, showing a plan view of the change-speed mechanism for controlling the orbital speed of the grinding spindle;

Fig. 10 is a longitudinal section taken substantially on the line 10—10 of Fig. 11;

Fig. 11 is a section taken substantially on the line 11—11 of Fig. 9, showing the arrangement of gears of the change-speed mechanism;

Fig. 16 is a diagrammatical plan view showing the rack and pinion connections between the centering devices which produces uniform movement thereof;

Fig. 17 is a diagrammatical side elevation of the centering devices and control means therefor shown in Fig. 16;

Fig. 18 is an enlarged fragmentary view of the rear side of the duplex grinding machine, showing portions of the water spraying device;

Fig. 19 is a fragmentary enlarged side elevation of the trip mechanism for reversing the direction of movement of the carriage;

Fig. 20 is a longitudinal section taken through the trip valve which controls the direction of movement of the carriage;

Fig. 21 is a fragmentary front elevation of the headstock, portions of the same being broken away to show the water passages therein;

Fig. 22 is a section taken substantially on the line 22—22 of Fig. 21;

Fig. 23 is a transverse section taken substantially on the line 23—23 of Fig. 2 showing the spray water control system;

Fig. 24 is an enlarged transverse section taken substantially on the line 24—24 of Fig. 22, showing the spray water control valve;

Fig. 25 is a longitudinal section through the spray water control valve, showing the different slots therein for use in connection with different width grinding wheels;

Fig. 26 is a diagrammatical outline showing the connections between the various hydraulically controlled parts of the grinding machine; and Fig. 27 is a diagrammatical outline showing the hydraulic control hook-up for the work centering shafts.

Referring to the accompanying drawings, in which like numerals refer to like parts throughout the several views, the duplex grinding machine comprises, in general, a base A upon which a pair of carriages B and C and a work supporting table D are mounted. Suitable headstocks E and F are rigidly secured to the carriages B and C respectively, and are reciprocable with the carriages to do the work upon the ends of the railway car axle G supported by the table D. These carriages are so arranged that they may be reciprocated simultaneously or independently while the grinding wheels are doing their work upon the ends of the car axle G.

The ends of the base which carry the carriages B and C are of substantially H-shape in cross-section in order to provide a pair of spaced longitudinal side rails 1 which engage suitable channeled ways 2 with a working fit, that are formed at the lower sides of the carriages. The means for reciprocating the carriages on the base A will be described later on in the specification.

Figure 12:
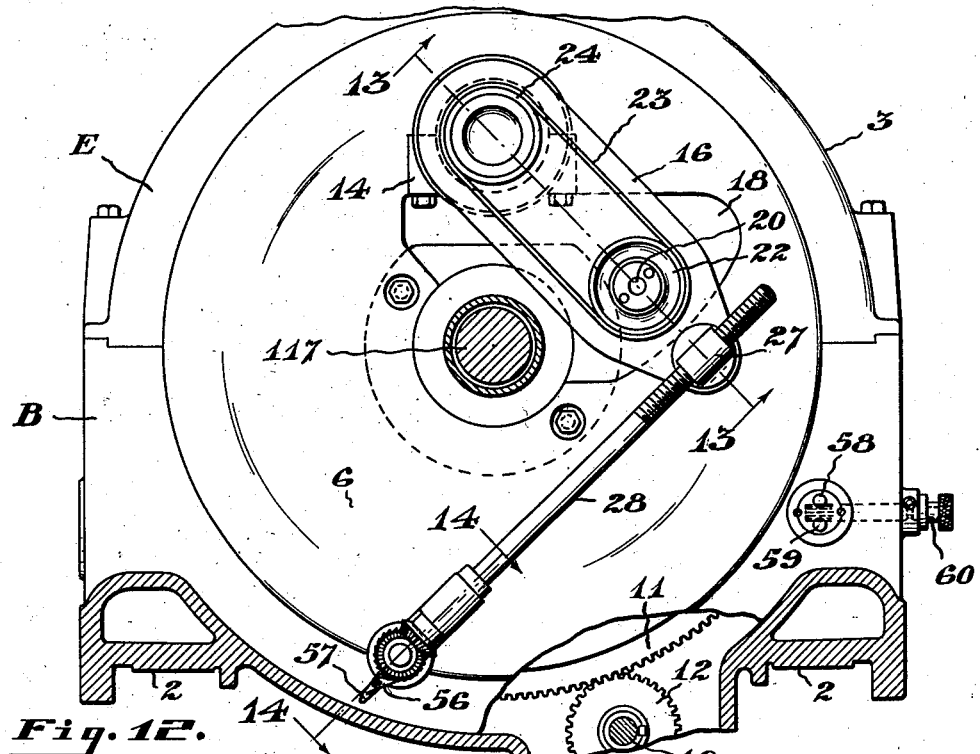
Fig. 12 is an enlarged section taken substantially on the line 12—12 of Fig. 2, showing the feed mechanism for the grinding spindle.

Each headstock comprises a stationary two-part housing 3 having a pair of spaced radial walls 4, each of which carries a bearing or bushing 5. Rotatably mounted within the bushings 5, as shown in Figs. 5, 7 and 12, is a rotatable cylinder 6 having a circumferential flange 7 that seats against the outer end of the housing 3. The inner end of the cylinder 6 abuts against and is secured to an annular plate 8 that has a circumferential rib 9 which is journaled within a circumferential groove 10 formed in the housing 3. The plate 8 and flange 7 hold the cylinder against axial movement relative to the housing 3. The cylinder 6, as shown in Figs. 7, 10 and 12, is rotated within the bushings 5 by means of a bull gear 11 mounted thereon and lying between the spaced radial walls 4. The bull gear 11 meshes with a pinion 12 which will be later described.

Figure 13:
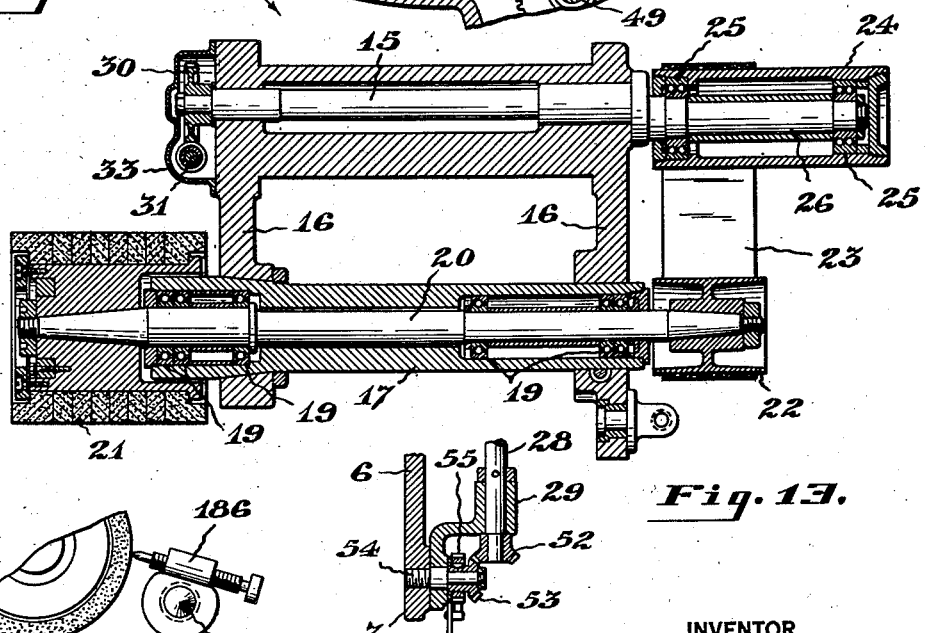
Fig. 13 is a section taken substantially on the line 13—13 of Fig. 12 showing the grinding spindle.

The cylinder 6 has an eccentric journal 13 mounted therein by suitable caps 14 and which carries a shaft 15. The journal 13 (Figs. 5 and 13), is provided with integral brackets 16 which lie externally of the cylinder 6 and receive a journal 17 that extends through openings 18 formed in the sides of the cylinder 6. The ends of the journal 17 are recessed and provided with suitable anti-friction bearings 19 which rotatably receive a spindle 20 upon the inner end of which the abrasive wheel 21 is suitably mounted. The inner end of the spindle 20 is provided with a pulley 22 which is driven by means of a belt 23 from a drive pulley 24. The drive pulley is rotatably mounted on bearings 25 carried by a shaft 26 that is eccentrically mounted upon the shaft 15 (Figs. 12 and 13). The brackets 16 are adjustably mounted at their free ends by means of a threaded nut portion 27 pivoted to the outer bracket and which threadably receives a shaft 28 that is rotatably mounted in a bracket 29 pivotally carried by the flange 7 of the cylinder. The means for adjustably actuating the feed shaft 28 will be later described.

The inner end of the shaft 15 projecting through the inner bracket 16 is provided with a worm wheel 30 that meshes with a pinion 31, and the worm pinion 31 is mounted on a squared shaft 32 which extends through the enclosing casing 33 (Figs. 5 and 13). It is obvious that by turning the shaft 32 the shaft 15 can be rotated to change the eccentric position of the shaft 26 so that the slack in the belt 23 can be taken up.

Each carriage is provided with a hollow base portion 34 spaced from the headstock and which supports a suitable drive motor 35. The base portion 34 supports an annular bracket 36 on which a rotatable pulley 37 is mounted, the pulley 37 being connected by a belt 38 to a drive pulley 39 mounted on one end of the motor shaft. The pulley 37 also is connected by a belt 40 to the pulley 24 mounted on the eccentric portion 26 of the shaft 15. The motor 35, therefore, through the medium of the belts 38, 40, and 23, drives the spindle 20 at a constant rate of speed.

This same motor 35, however, in addition to driving the grinding spindle 20, is also adapted at the same time to rotate the cylinder 6 to provide an orbital movement of the grinding spindle 20. A pulley 41 is secured to the opposite end of the motor shaft and by means of a belt 42 drives a counter shaft 43 which in turn by means of a belt 44 drives a pulley 45 that is mounted on the main shaft 46 of a suitable change-speed mechanism mounted within the carriage (Figs. 1, 3, 6 and 7). The change-speed mechanism, as it may be of any conventional type to provide a plurality of speeds for the change-speed countershaft 47, need not be described in detail. The countershaft 47 of the change-speed mechanism is connected through suitable means to a shaft 48 which in turn is connected to a shaft 49. The pinion 12 that drives the main cylinder bull gear 11 is connected to the shaft 49. By shifting one or the other of the levers 50 on the carriage, certain of the change-speed gears 51 mounted on the transmission shafts 46, 46a and 47 may be thrown into driving operation with each other to obtain the desired orbital speed of the grinding spindle 20.

The grinding spindle 20 thus may be rotated about its axis at a constant speed and may be given any desired orbital rate of speed, which speed may be changed at will by shifting the levers 50 to throw the different gears 51 in operative relation.

The threaded shaft 28 provides an automatic feed means for moving the grinding wheel toward the work after each complete orbital movement thereof. The end of this shaft which is journaled in the bracket 29 is provided with a bevel pinion 52 that meshes with a similar bevel pinion 53 mounted on a stud 54 which pivotally secures the bracket 29 to the cylinder 6. A ratchet wheel 55 is keyed to the pinion 53 and is adapted to be engaged by a spring pressed pawl 56 that is mounted on a suitable pivoted trigger finger 57. This mechanism rotates with the cylinder 6 and it is so arranged that after each complete revolution the finger 57 will engage one of two rods 58 and 59. These rods 58 and 59 have rack surfaces which engage opposite sides of a toothed shaft 60 that is carried by the headstock 3. By turning the shaft 60 in one direction the rod 58 is moved outwardly and the rod 59 is moved inwardly, and by turning the shaft 60 in the opposite direction, the rod 59 is projected as the rod 58 is withdrawn. These rods regulate the depth of cut that is to be made by the grinding wheel 21. With the rod 58 projected, the finger 57 upon each revolution of the cylinder 6 (which is in a clockwise direction as viewed in Fig. 12), strikes the rod 58 thereby causing the pawl 56 to move the pinion 53 a predetermined distance. This in turn causes the threaded shaft 28 to draw the spindle 20 inwardly toward the work so that the next succeeding cut can be made by the grinding wheel. When the rod 58 is withdrawn and the rod 59 projected, the finger 57 and pawl 56 actuate the ratchet a lesser predetermined distance so that a lighter cut can be made, since the rod 59 is a greater distance from the axis of the cylinder 6 than the rod 58.

The feed of the grinding wheel, therefore, is automatic, and the depth of the cut or surface to be removed is governed by which pin the trigger mechanism strikes during each revolution of the cylinder 6.

The carriages B and C, as previously stated, are reciprocated simultaneously or independently while the grinding wheels are subjected to both orbital and rotary movements. This reciprocation of the carriage is provided for by an independent hydraulic system for each carriage. Each of these systems comprises, as shown in Figs. 7, 19, 20 and 26, a bracket 61 secured to the under side of the carriage to which a piston rod 62 having a piston 63 is longitudinally mounted. The piston 63 is adapted to reciprocate in a stationary cylinder 64 mounted in the base A and the means for moving the piston 63 is provided by admitting liquid under pressure alternately to opposite ends of the cylinder 64.

Referring to Figs. 20 and 26, two conduits 65 and 66 alternately admit fluid under pressure to the opposite ends of the cylinder 64 and these conduits lead to a chamber 71 within a suitable valve housing 72 that has a slidable piston valve 73 which controls the opening and closing of the ports leading to the conduits 65 and 66. This chamber 71 is connected through by-passes 74 and 75 with a second chamber 76. The chamber 76 is connected with a hydraulic pressure pump 70 by means of pressure and return conduits 68 and 69, respectively, the pump having a high pressure outlet and a low pressure outlet. The chamber 76 is provided with a slide valve 77 which connects the high pressure conduit 68 through the chamber 76 with the by-pass 74 and which connects the return conduit 69 with the by-pass 75.

Referring again to Fig. 20, which shows the position of the valve mechanism when the carriage B is being moved toward the center of the machine, the liquid under pressure enters the chamber 71 from the high pressure conduit 68 and by-pass 74 where it is conducted through the conduit 65 to the cylinder 64 for doing useful work in moving the carriage forwardly. During this movement the liquid on the opposite side of the piston 63 is forced through the conduit 66 to the chamber 71 where it is exhausted through the by-pass 75 to the return conduit 69 leading back to the pump. When the carriage reaches the end of the forward movement, the valve 73 in the chamber 71 is automatically moved by means which will now be described, to connect the by-pass 74 with the conduit 66 to admit the liquid to the opposite side of the piston and to connect the conduit 65 with the fluid return by-pass 75. Pressure is therefore exerted against the opposite side of the piston 63 to move the carriage B rearwardly.

The reversing valve 73 is also automatically shifted by hydraulic means and is provided with pistons at its ends which close off the ends of the cylindrical chamber 71. These chamber ends are connected through passageways 78 and 79 to a third cylindrical chamber 80 having a slide valve 81 therein. The entrances of the passageways 78 and 79 into the chamber 80 are adapted to be opened and closed by portions 82 and 83, respectively, formed on the valve rod 81. The portion of the chamber 80 between the spaced pistons 82 and 83 of the valve rod 81 in one housing 67 is connected with the corresponding portion of the other valve housing through a feed conduit 84. This conduit 84 is connected by a pressure conduit 84a to the low pressure outlet of the pump 70 at the right end of the machine as viewed in Fig. 26. In each valve housing 67, the portions of the chamber 80 outwardly of the spaced pistons 82 and 83 are interconnected by a by-pass 85. The by-pass 85 of each valve housing 67 is connected through a return conduit 86 to the return port of the adjacent pump 70. As shown diagrammatically in Fig. 26, the return conduit 86 of the pump 70 at the left side of the machine is connected through an oil level conduit 86a to a return port of the pump 70 at the right end of the machine. It is obvious that by sliding the valves 81 the conduit 84 may be connected with the passageways 78 and the conduits 86 with the passageway 79 and vice versa. The end of the valve 81 extending through the housing 72 is pivoted to a rocker arm 87 that is in turn pivoted, as shown in Fig. 19, to a rocker arm 88. The rocker arm 88 is pivoted intermediate its ends to the base A and the free end thereof extends above the edge of the carriage.

A longitudinally extending rod 89 is secured to the side of each carriage and is provided with a pair of stops 90 which alternately engage opposite sides of the rocker arm 88 at the ends of the reciprocating movement of the carriage. These stops 90 are adjustable on the shaft 89 so that the length of stroke of the carriage can be regulated.

Continuing with the description of the operation of the hydraulic reciprocating system: The rear stop 90, when the carriage B reaches the end of its forward movement, engages and pivots the rocker arm 88. This causes the rocker arm 87 to shift the valve 81 forwardly, thus connecting the conduit 84 with the passageway 79 and the passageway 78 with the return conduit 86, so that the fluid under pressure from the pump flows through the passageway 79 against the end of the reversing valve 73 and shifts the valve 73, the liquid at the other end of the chamber 71 being discharged through the passageway 78 and conduit 86. This allows the liquid under pressure to move the carriage rearwardly. Now as the carriage B reaches its rearward position the foremost stop 90 on the shaft 89 engages the other side of the rocker arm 88 and shifts the valve 81 to the forward position shown in Fig. 20 which admits liquid to move the valve 73 to the position shown in Fig. 20.

The carriage is provided with a safety mechanism which will function in cases where the valve 81 might fail to operate. The valve 77 in the chamber 76 into which the main pump conduits 68 and 69 connect is arranged to close off the by-passes 74 and 75 when actuated manually or by means of linkage which functions when the valve 81 fails to operate. One end of the valve 77 is connected to a pivoted bell crank 91 which in turn is pivoted to a second bell crank 93 by means of a connecting rod 92. The bell crank 92 is pivoted to the base A and is connected through a spring 94 to a lever 95 having a roller portion at its end. Stops 96 arranged rearwardly of the stops 90 are arranged to engage the roller portion of the lever 95 and close the valve 77, should either of the stops 90 or the valve 81 fail to operate, so that the carriage will be immediately stopped from further reciprocation.

The speed with which each carriage is reciprocated is controlled from the base A by means of a lever 97 mounted on a shaft 98 extending through the base and connected through gearing 99 with a valve (not shown) within the pump, which controls the volume of liquid being pumped. This valve is adapted to completely shut off the supply of liquid under pressure and to regulate the volume of liquid so that the speed of carriage reciprocation can be variably controlled. It is preferable to provide a graduated dial 100 for the control lever 97, so that the exact speed of carriage reciprocation desired can be obtained by setting the lever 97 at a predetermined position on the dial 100.

The car axle G is carried by a pair of spaced support shafts 101, which are vertically movable relative to the work supporting table D, each of which is provided with a V-block 102 at its upper end. The sides of the V-blocks 102 are arranged to engage and support the axle preferably from the flanges against which the wheels abut. The support shafts 101 are raised and lowered by pistons 103 at their lower ends which are reciprocable by hydraulic pressure within suitable cylinders 104. (See Figs. 2, 5 and 26.) Suitable guides 105 parallel with the shaft 101 are provided to prevent turning of the V-block 102. The upward stroke of the piston 103, if desired, may be regulated and limited by means of a limit sleeve 106 which is threadedly mounted within shaft housing 107.

The limit sleeves 106 provide means whereby the limit of the stroke of the V-block supports can be adjusted to compensate for car axles of different diameters.

The V-block supports, as previously described, are hydraulically operated. Each cylinder 104 is provided with conduits 108 and 109 at opposite ends thereof, which lead to a pair of common pressure lines 110 and 111, respectively. These pressure lines 110 and 111 lead to a control valve housing 150 which in turn is connected through pressure and return conduits 113 and 114 to the low pressure and return lines 84 and 86 that lead from the pump 70 at the right end of the machine to the corresponding carriage control valve housing 67. The passage of liquid under pressure through the housing 150 is controlled by a three-way valve 153 which is actuated by a control handle 154 mounted on the front of the work supporting table D. It is obvious that by shifting the valve 153 to one position liquid under pressure is forced through the cylinder supply lines 108 to raise the two V-blocks 102, and that by shifting the valve 153 to another position the liquid is forced through the cylinder supply lines 109 to lower the V-blocks.

The V-block supports are arranged to travel at the same rate of speed in order that one will not move ahead of the other, which might be the case where a wheel was mounted on one end of the axle only. It is apparent that the increased weight over one of the V-blocks supports might cause that support to lag during its movement.

Each cylinder 104 is provided with a surrounding clamp 190 below the top of the support table D. A suitable rack 191 is guided in the clamp 190 and is secured to one of the guide rods 105 of the V-block support 101. A horizontal shaft 192 is journaled at its ends in the clamps 190 carried by the cylinders 104 and carries rigidly secured gears 193 at its ends which mesh with the racks 191. The racks 191 and gears 193 thus provide a mechanical hook-up between the two V-block supports so that the supports will uniformly travel at the same rate of speed during their reciprocation. It is obvious that this will prevent one of the V-block supports traveling in advance or behind the other.

In operation, the axle G is raised to a position slightly less than its final supported position, that is, to a position where the axis of the axle is slightly below the center line of the headstock cylinders 6. In final supported position, the axis of the axle is coincident with the center line of the headstock cylinders 6.

Referring to Figs. 7 and 27, the grinding machine is provided with a pair of work centering shafts 117, each of which is longitudinally and slidably supported by a bearing 118 carried by the annular pulley supporting bracket 36 and a suitable anti-friction bearing 119 carried by the headstock main cylinder 6. The bearing 118 and the bearing 119 are provided with tapered portions which are longitudinally adjustable to compensate for wear. These work centering shafts 117 are disposed on identically the same axis and are adapted to simultaneously move toward and away from each other at the same speed. As shown in Figs. 7, 16 and 17 each centering shaft 117 is provided with an arm 120 to which a suitable rack 121 is secured. The racks are guided in housings 122 secured to the ends of the base A and each housing contains a vertical shaft 123 provided with pinions 124 and 125 at its upper and lower ends, respectively. The upper pinions 124 mesh with the racks 121 and the lower pinions 125 of the shafts 123 mesh with lower racks 126. These lower racks 126 are longitudinally guided for sliding movement and extend toward the center of the machine where they mesh with opposite sides of a gear 127. The gear 127 is supported by a vertical shaft 128 contained within a housing 129 secured to the base A of the grinding machine. It is obvious that the longitudinal movements of the centering shafts 117 will be at the same speed because of the rack and pinion control.

Longitudinal movement is imparted to the centering shafts 117 by means of pistons 130 that are operatable in cylinders 131 and which are connected to the centering shafts 117 by means of piston rods 132. Liquid under pressure is alternately conducted to opposite ends of each cylinder 131 through conduits 133 and 134. The conduits 133 and 134 for the one cylinder 131 communicate with the corresponding conduits of the other cylinder to effect an equalization of pressure, and they connect into pressure lines 135 and 136, respectively, which lead to a valve housing 137.

As shown in Fig. 27, liquid under pressure is fed to the valve housing 137 through a supply line 138 that connects through conduits 195 and 196 to a pair of oil gear pumps 197 and 198, respectively. Liquid is drawn by the pumps 197 and 198 through conduits 199 and 200, respectively, from a reservoir 201. The pressure lines 195 and 196 leading from the pumps are also connected by by-pass conduits 202 and 203 to the reservoir 201. The opposite ends of each cylinder communicate with each other through an air line conduit 204 and each conduit is provided with a conduit 205 which leads to the liquid reservoir 201. The valve housing 137 is connected to the liquid reservoir 201 through a suitable liquid return conduit 139.

The housing 137 is provided with a suitable control valve 140 having a control lever 141 secured to the base A adjacent the control lever 116 for the V-block control device. By correctly moving the lever 141 in one direction, liquid under pressure flows through the pressure lines 133 to move the centering shafts 117 toward each other, and by reversing the lever, liquid flows through the other lines 134 to the cylinders 131 to move the shafts 117 away from each other. Furthermore, by positioning the lever 141 and therefore the valve 140 in a neutral position, the shafts 117 can be set in any desired position. The shafts 117 are provided with removable centering cones 142 at their inner ends to engage the centers of the car axle G.

Figure 2:
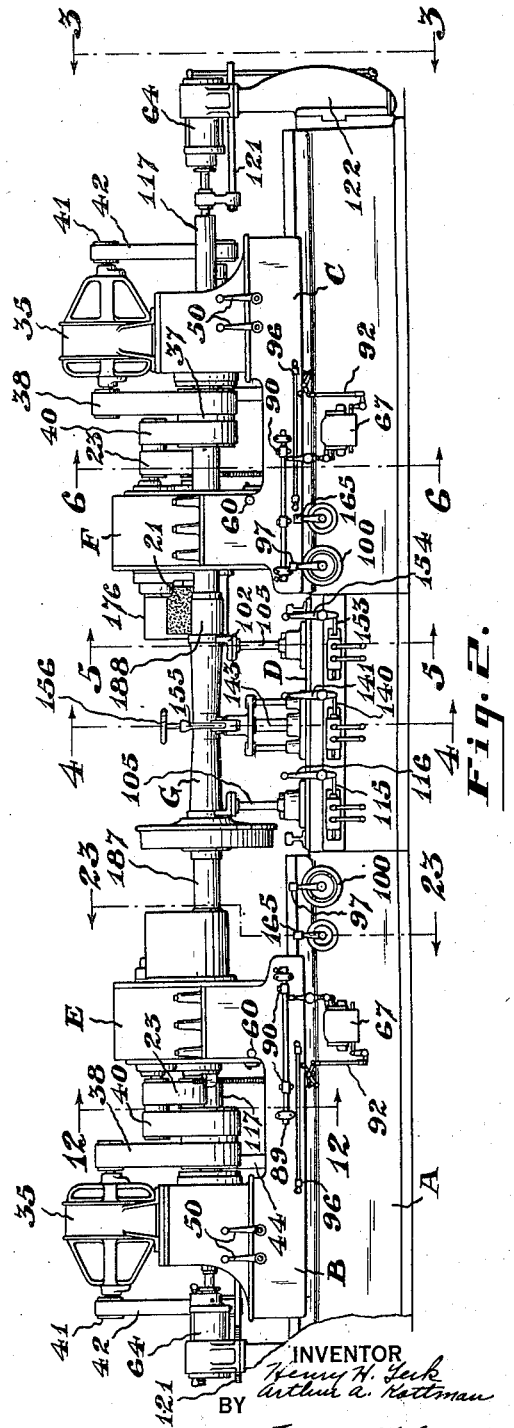
Fig. 2 is a side view of the duplex grinding machine shown in Fig. 1.

The car axle, as previously mentioned, is raised to nearly centered position and the centering shafts 117 are then moved toward each other so that the centering cones 142 thereof raise the car axle to a true centered position in order that it will be in true axial alignment with the center line of the headstock cylinders 6. As soon as this is done, a steady rest is raised to engage the axle directly intermediate its ends to partially carry the weight of the axle and to remove any deflection in the axle that would enter in through its own weight, when mounted to work centers. This steady rest comprises, as shown in Figs. 2, 4 and 26, a vertically slidable piston rod 143 having a piston 144 at one end and a V-block 145 at its other end which engages the axle G. The piston 144 operates in a cylinder 146 carried by the work support D intermediate the V-block supports 101. Side guide rods 147 are provided to prevent turning of the V-block 145 with respect to the car axle G.

The piston 144 and steady rest is raised and lowered by liquid under pressure which is conducted to opposite ends of the cylinder 146 through conduits 148 and 149 (see Figs. 4 and 26), from a valve housing 112. The housing 112 is connected by low pressure and return conduits 151 and 152 to the low pressure and return ports of the pump at the left end of the grinding machine. A suitable slide valve 115 actuated by a control handle 116 secured to the machine base A is employed to admit liquid under pressure to one or the other of the conduits 148 and 149 to raise or lower the steady rest just described.

The steady rest, after the car axle is centered to the correct position between the work centers, is raised to completely or partially support the axle intermediate its ends. The V-block 145 is provided with a bridge or yoke 155 which is adapted to straddle the axle and which is provided with a suitable set screw 156 that can be tightened to securely clamp the axle and hold it against rotation.

If desired, the steady rest just described may be omitted and the V-block supports may be used to support and to vertically locate the car axle. In this case, the centering shafts 117 would only be used to obtain the correct longitudinal position of the car axle. In using the V-blocks to vertically position the car axle with respect to the center lines of the main cylinders, suitable adjustable stops may be provided against which the axle could strike when moved upwardly by the V-block supports. The axle may, in this case, also be clamped to the V-blocks after it is centered longitudinally by the centering shafts 117.

The axles are preferably ground by the wet grinding process,—that is, a spray of water is continuously fed to the surface while it is being ground. The invention also contemplates a novel arrangement for conducting the water or other liquid to the surface being ground.

The spray or grinding liquid is pumped by a pump 157 from a reservoir 158 through a valve controlled feed pipe 159 to a distributing pipe 160 secured to the rear side of the grinding machine. Each of the carriages carries a tubular bracket member 161 having a tubular extension 163 of reduced diameter, that telescopically receives a pipe 162 which is telescoped with the distributing tube 160. The pipes 162 are entirely open at their ends lying within the distributing tube 160 but have side openings 164 only at their other ends which, when the carriages are retracted, are closed off by the tubular extensions 163, since they are slidably telescoped therewith. When the carriages are moved toward each other the tubular brackets 161 and extensions 163 thereof slide along the stationary tubes or pipes 162 and uncover the side openings 164 to permit water or other liquid to flow therethrough to the grinding wheels. It is obvious, therefore, that the supply of water is automatically shut off as the carriages reach their retracted positions.

The position of each carriage at which the liquid is shut off is regulatable from the front of the grinding machine by a lever 165 connected with a shaft 166 extending transversely through the machine. This shaft carries a pinion 167 that is engageable with a guided rack 168 which is secured to the pipe 162 by a bracket 169. By turning the pinion 167 the rack 168 slides the pipe 162 longitudinally within the distributing tube 160 and the bracket extension 163. This obviously changes the position of the side opening 164 in the pipe 162, so that its point of opening and closing is regulatable.

The tubular bracket 161 on each carriage is connected through flexible tubing 170 and a pipe 171 to the interior of the cylinder housing 3, as shown in Figs. 18 and 21. The housing 3 is formed with an annular water jacket 172 into which the water is conducted through the pipe 171. The wall of the jacket 172 is formed with a plurality of spaced arcuate slots 173 which open into the groove 10 within which the rib 9 of the main cylinder plate 8 is received.

An opening 174 is formed in the end plate 8 which registers with each slot 173 as it passes thereover and admits water or other liquid through a conduit 175 to an arcuate grinding wheel guard 176. The grinding wheel guard 176 is secured to the plate 8 and formed with a tubular portion 177 parallel to the axis of the grinding spindle which receives a shell 178 and a tubular rotatable valve 179 within the shell. Cooling water or other liquids enters the interior of the valve 179 through a port 180 which is registerable with a port 181 formed in the body of the valve 179, the valve 179 being rotatable within the shell 178 by means of a handle 182 to prevent liquid from entering the interior thereof. The valve 179 is formed with at least three longitudinal slots 183 of different length which can be brought into registering alignment with registered slots 184 formed in the shell 179 and tubular portion 177. The slots 183 of different length are provided for supplying grinding wheels of different length with liquid through the slots 184. The slots 184 are formed with tapered walls through which the liquid exhausts in a spray adjacent the contacting surfaces of the grinding wheel and the axle being ground. Waste liquid falls to the upper portions of the base A where it is conducted through suitable conduits 185 back to the reservoir 158.

It is to be particularly noted that during the grinding of the axle, the spray of water or liquid rotates with the cylinder 6 and constantly impinges against the surface being ground, regardless of the orbital position of the grinding wheel 21 with respect to the car axle G. The slot 183 in the valve 179 can be moved to direct the flow of water to the point of contact between the work and the grinding wheel, regardless of their respective diameters.

Figures 14, 15:
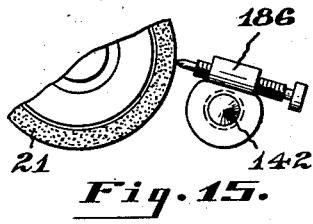
Fig. 14 is a section taken on the line 14—14 of Fig. 12 and showing the automatic feed mechanism.
Fig. 15 is a view showing a means for dressing the grinding wheel.

Referring to Fig. 15, each of the centering shafts 117 is adapted to receive a suitable tool 186 for dressing the grinding wheel.

In the operation of the duplex grinding machine of the present invention, the car axle G, the journals 187 or wheel seats 188 of which are to be ground, is placed in a position to be engaged by the V-blocks 102 of the supports 101 and then the lever 154 which actuates the valve 153 is moved to a position whereby the liquid under pressure from one of the hydraulic pressure pumps 70 raises the V-blocks and the car axle G supported thereby to a position slightly below the center line of the centering shafts 117. The controlling lever 141 for the valve 140 is then shifted to permit liquid under pressure to enter the cylinders 131 whereby the liquid causes the pistons 130 to move the centering shafts 117 toward each other so that the centering cones 142 engage the centers at the opposite ends of the car axle G to thereby raise the car axle G to the correct centered position with respect to the axes of the headstock cylinders 6. It is to be particularly noted during the movement of the centering shafts 117, that the centering shafts move toward each other uniformly at the same speed because of the rack and pinion devices shown in Figs. 16, and 17.

As soon as the car axle G is accurately centered the controlling lever 116 is moved to actuate the valve 115 whereby the steady rest 143 is raised until the V-block 145 thereof engages the axle midway between its ends. The pressure of the liquid within the steady rest cylinder 146 is regulated so that the steady rest will substantially carry the entire weight of the car axle. This is done so that any deflection in the axle that would enter in through the weight of the axle when mounted to the work centers will be removed. The yoke 155 of the V-block 145 is then placed over the car axle and the set screw 156 thereof tightened down so as to rigidly clamp the car axle against the V-block 145 and thereby prevent any inadvertent rotational movement of the car axle.

The power for the motor 35 is then turned on which causes the grinding wheels 21 to rotate through the medium of the rotatable main cylinder 6 to move in an orbital path about the ends of the car axle. The grinding wheel 21 is then brought to the surface of the car axle to be ground, such as the bearings 187 thereof, by rotating the regulating shaft 28 which moves the spindle supporting brackets 16 about the shaft 15 as an axis.

The carriages B and C are then set in reciprocating motion by setting the controlling levers 97 for each carriage to the correct position on the dials 100. These dials 100 are calibrated so that the desired volume of liquid enters the carriage cylinder 64 to produce the desired speed of reciprocation.

Figure 1:
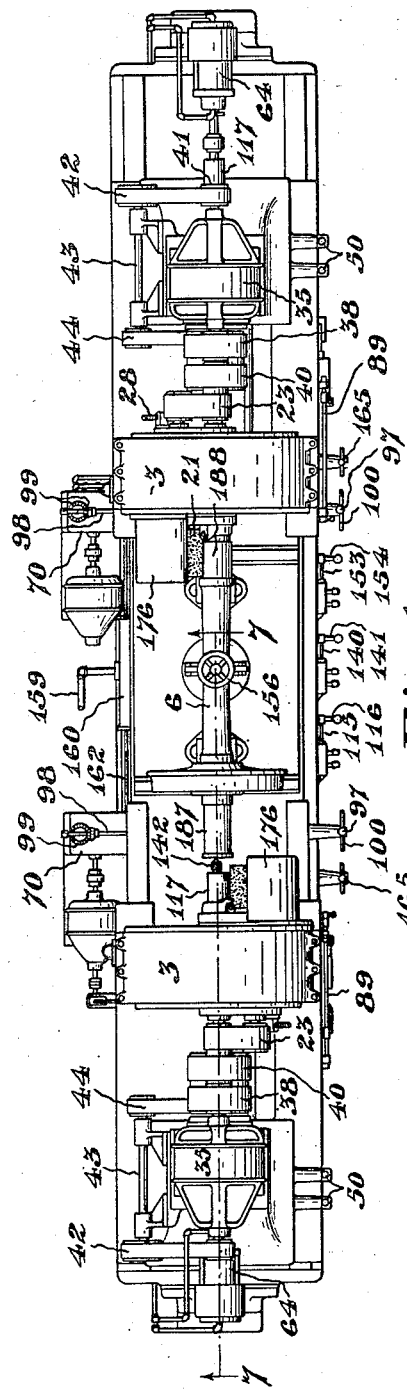

The carriages B and C are so regulatable by the controlling levers 97 that they may reciprocate relative to the axis of the car axle being ground simultaneously in the same direction or in opposite directions at the same or different speeds, or they may reciprocate independently of each other in such a manner that one of the carriages may remain stationary. Furthermore, the orbital rate of speed of the two grinding wheels may be different while the rate of reciprocating movement thereof is the same. As shown in Figs. 1 and 2, the carriage B is stationary and the grinding wheel 21 carried by the headstock F is grinding the right wheel seat 188. It is obvious, however, that while the wheel seat 188 is being ground as indicated in Figs. 1 and 2, the carriage B and grinding wheel 21 carried thereby may be in operation to simultaneously grind the journal seat 187 to the desired size. In this case, however, it is necessary to provide the carriages with a different length and possibly different speed of reciprocation because of the difference in length between the wheel seat and the journal. The strokes of the carriages B and C are independently controlled by adjusting the stop members 90 which are positioned on the longitudinal shafts 89 carried by the carriages. These are the stops which control the point at which the cylinder controlling valve 73 cuts off the flow of liquid under pressure to the opposite ends of the cylinder 64 for each carriage. It is also necessary in this case to control the length of time that the cooling water for each grinding wheel is discharged. This is accomplished by regulating the valve control 165 which shifts the opening 164 in the water pipe 162 relative to the housing 161.

During the grinding of the ends of the car axle, the grinding wheel of each headstock after making one complete orbital movement, is automatically moved to the surface being ground to the desired degree by means of the ratchet device shown in Figs. 12 and 14. Upon each complete revolution of the main cylinder 6 the finger 57 of the ratchet device strikes either one or the other of the shafts 58 and 59, depending upon which one is projected, which causes the ratchet wheel 55 to rotate the shaft 28 and move the spindle supporting brackets 16 toward the axis of the car axle G.

As previously stated, the grinding wheels 21 are rotated at a constant uniform speed. The orbital movement of the grinding wheels 21, however, may be changed in accordance with the diameter of the ends of the car axle and the material being ground by actuating one or the other of the levers 50, which brings certain of the change speed gears 51 into operation.

After the work being performed on the ends of the car axle is completed, the carriages are moved to their completely retracted positions at the ends of the machine base. (The carriage B is shown in this position in Fig. 2.) The yoke 155 is then removed and the steady rest is lowered out of engagement with the car axle by actuating the control lever 154. The work centering shafts 117 are then retracted out of engagement with the ends of the car axle and the supports 101 are then lowered so that the car axle can be removed from the grinding machine.

It is to be noted that the base A is comprised of three separate portions suitably secured together and mounted on a bed portion, the end portions of which carry the carriages B and C. In case there is a difference in the wear of the headstock parts and centering shafts, the end portions of the base may be shifted relative to each other and shimmed up to compensate for this difference.

Another feature of the invention, though not shown in the drawings, is that all the moving parts are provided with a force-feed lubrication.

The grinding machine of the present invention is so designed that portions of the car axle shaft can be ground with both wheels mounted thereon or removed therefrom, or with only one of the wheels mounted thereon, as shown in Fig. 2.

It is seen that the grinding wheels rotate about their own axes, about the axes of the main cylinders of the headstocks, and also reciprocate simultaneously or independently in a direction axial to the car wheel, and that during the orbital movement of the grinding wheels a spray of water is continuously directed to the surfaces being ground, or rather to the actual point of contact of the grinding wheels with the ends of the car axle regardless of the circumferential position of the grinding wheels relative to the car axle and regardless of the respective diameters of the work and grinding wheels.

It is to be noted that simple and efficient means is provided for hydraulically controlling the various parts of the grinding machine, and that separate controls are provided for each of the reciprocable carriages.

A further feature of the present invention is the provision of the hydraulically controlled work centering shafts which extend axially through the headstock cylinders, the headstock cylinders being reciprocable relative to the centering shafts.

Aside from the specific embodiments of the invention herein shown and described, it will be understood that numerous details of the construction illustrated may be altered or omitted without departing from the spirit and scope of this invention, and it is not desired to limit the invention to the exact construction set forth herein, as it is desired to claim the invention broadly as well as specifically as indicated in the appended claims.

What we claim is:

1. In a grinding machine for grinding cylindrical surfaces, a base, a rotatable headstock cylinder mounted thereon, a grinding wheel spindle eccentrically mounted on said headstock cylinder to move in an orbital path about the surface being ground, a non-rotatable work centering shaft extending axially through said headstock cylinder, and means for moving said centering shaft axially relative to said cylinder for engaging the center of the work being ground.

2. In a grinding machine for grinding cylindrical surfaces, a base, a carriage reciprocably mounted on said base, a rotatable headstock cylinder carried by said carriage, a grinding wheel spindle eccentrically mounted on said cylinder to move in an orbital path about the axis of said cylinder, and means for holding the work being ground stationary during such orbital movement of said spindle, said means comprising a non-rotatable work-centering shaft extending axially through said cylinder, said carriage being reciprocable relative to said centering shaft and said centering shaft being axially movable independently of said headstock cylinder.

3. In a machine for grinding cylindrical surfaces, a base, a pair of headstocks mounted on said base, a pair of rotatable cylinders within said headstocks, a grinding wheel spindle eccentrically carried by each of said cylinders to move in an orbital path, grinding wheels carried by said spindles to grind opposite ends of a piece of work, and means for holding the work stationary between said headstocks during the grinding operation comprising axially aligned, axially movable centering shafts extending axially through said rotatable cylinders to axially engage the opposite ends of the work.

4. In a machine for grinding cylindrical surfaces, a base, a pair of reciprocable carriages mounted on said base, a rotatable cylinder and rotating means therefor carried by each said carriage, a grinding spindle mounted on each cylinder to rotate in an orbital path about the axes of the cylinder, grinding wheels carried by said spindles for simultaneously or independently grinding opposite ends of a piece of work, and means for holding the work stationary during the grinding operation comprising a pair of axially aligned non-rotatable centering shafts extending axially through said cylinders to axially engage the ends of the work, said carriages and the cylinders carried thereby being reciprocable relative to said centering shafts and said centering shafts being axially movable independently of said carriages and said rotatable cylinders.

5. In a grinding machine for grinding railway car axles, a pair of spaced rotatable headstock cylinders having eccentrically mounted grinding wheel spindles, a pair of longitudinally movable centering shafts mounted axially within said cylinders, each engageable with an end of the axle to be ground for holding the axle in axial alignment with said headstocks, a single controlling means for simultaneously actuating said centering shafts, and means for rigidly holding the axle being ground against rotation.

6. In a griding machine for grinding railway car axles, a pair of spaced rotatable headstocks, grinding spindles eccentrically carried by said headstocks and having grinding wheels mounted thereon, a pair of axially aligned longitudinally movable axle centering shafts, each engageable with an end of the axle to be ground for holding the axle in axial alignment with said headstocks, means for rigidly holding the axle being ground against rotation, means for moving said centering shafts toward and away from each other, and means connecting said centering shafts whereby said shafts will move uniformly at the same rate of speed.

7. In a grinding machine for grinding railway car axles, a pair of spaced rotatable headstocks, grinding spindles eccentrically carried by said headstocks and having grinding wheels mounted thereon, a pair of axially aligned longitudinally movable axle centering shafts, each engageable with one end of the axle to be ground for holding the axle in axial alignment with said headstocks, means for rigidly holding the axle being ground against rotation, and actuating means for moving said shafts toward and away from each other, said shafts extending axially through said headstocks and having axial movement relative thereto.

8. In a grinding machine for grinding railway car axles, a pair of spaced rotatable headstocks, grinding spindles eccentrically carried by said headstocks and having grinding wheels mounted thereon, a pair of axially aligned longitudinally movable axle centering shafts, each engageable with an end of the axle to be ground for holding the axle in axial alignment with said headstocks, means for rigidly holding the axle being ground against rotation, a pair of cylinders, a piston in each of said cylinders connected with one of said shafts, and means for admitting fluid under pressure to said cylinders for actuating said pistons.

9. In a grinding machine for grinding railway car axles, a pair of spaced rotatable headstocks, grinding spindles eccentrically carried by said headstocks and having grinding wheels mounted thereon, a pair of axially aligned longitudinally movable axle centering shafts, each engageable with an end of the axle to be ground for holding the axle in axial alignment with said headstocks, means for rigidly holding the axle being ground against rotation, a pair of cylinders, a piston in each of said cylinders connected with one of said shafts, conduits connecting the corresponding opposite ends of said cylinder for admitting fluid to opposite sides of the pistons therein, conduits connecting said first conduits with a source of fluid, and a single valve means for controlling the admission of fluid under pressure to said cylinders to produce simultaneous movement of said centering shafts.

10. In a grinding machine for grinding railway car axles, a pair of spaced rotatable headstocks, grinding spindles eccentrically carried by said headstocks and having grinding wheels mounted thereon, a pair of axially aligned longitudinally movable axle centering shafts, each engageable with an end of the axle to be ground for holding the axle in axial alignment with said headstocks, means for rigidly holding the axle being ground against rotation, a pair of cylinders, a piston in each of said cylinders connected with one of said shafts, a single means for simultaneously controlling the admission and exhaust of fluid under pressure to and from said cylinders for producing longitudinal movement of said centering shafts, and means for causing said centering shafts to simultaneously and uniformly move at the same rate of speed.

11. In a grinding machine having a pair of spaced headstocks for working on the opposite ends of an article, a pair of centering shafts movable to engage the opposite ends of the article, means for moving said shafts, and connecting means between said shafts for causing them to have the same rate of travel, said connecting means comprising rack and pinion devices engaging a central gear at opposite sides thereof.

12. In a grinding machine having a pair of spaced headstocks for working on the opposite ends of an article, a pair of centering shafts movable to engage the opposite ends of the article, means for moving said shafts, and connecting means between said shafts for causing them to have the same rate of travel, said connecting means comprising a rack connected to each shaft, a pinion and shaft assembly for each rack, a second rack for each assembly, and a central gear, said second racks being meshed with opposite sides of said central gear.

13. In a machine for grinding a cylindrical surface, a headstock having a rotary main cylinder, a grinding spindle eccentrically mounted on said cylinder and having a grinding wheel thereon, said spindle being rotatable about its own axis and about the axis of said cylinder, and means carried by said head adjacent the circumferential surface of said grinding wheel for discharging a cooling liquid to the line of engagement of said wheel with the article being ground during the entire orbital movement of said grinding wheel.

14. In a machine for grinding a cylindrical surface, a headstock having a rotary cylinder, a rotatable grinding wheel eccentrically mounted on said cylinder and movable therewith in an orbital path around the surface being ground, and a cooling liquid discharging device carried by said rotary cylinder and arranged to discharge liquid directly to the line of engagement of said wheel with the surface being ground during the entire orbital movement of said wheel.

15. In a machine for grinding cylindrical surfaces, a headstock comprising a stationary cylinder having a liquid receiving annular passageway and ports in said passageway, and a main cylinder rotatable within said stationary cylinder, said main cylinder having one side provided with an opening to register with said ports, a liquid discharge device secured to said side of said main cylinder and in communication with said opening, and a grinding wheel eccentrically mounted on said main cylinder to move in an orbital path about the surface being ground, said liquid discharge device having a port therein for discharging cooling liquid received from said annular passageway in said stationary cylinder directly against the surface in contact with said grinding wheel during the entire orbital movement of said wheel.

16. In a grinding machine having a pair of reciprocable carriages provided with grinding wheel headstocks, means for supplying cooling liquid to said headstocks comprising, a pump, a central tubular distributing chamber connected with said pump, a pair of pipes telescoped with said chamber, and a tubular member secured to each of said carriages and having a portion of reduced diameter slidably telescoped with the adjacent pipe, said pipes having side ports therein arranged to be opened and closed by said portions of reduced diameter during the reciprocation of said carriages.

17. In a machine for grinding railway car axles having a rotatable head and a grinding wheel eccentrically mounted on said head, a pair of centering members engageable with the opposite ends of the axle to be ground for axially centering the same with respect to said head, and a steady rest engageable with the axle substantially midway between its ends to carry the major portion of the weight of said axle, said steady rest comprising a fluid pressure cylinder, a piston mounted for reciprocation in said cylinder, a piston rod secured to said piston, a V-block on said piston rod engageable with the axle, and means on said V-block for rigidly clamping the axle thereto.

18. In a machine for grinding railway car axles having a rotatable head and a grinding wheel eccentrically mounted on said head, a pair of centering members engageable with the opposite ends of the axle to be ground for axially centering the same with respect to said head, and a steady rest engageable with the axle substantially midway between its ends to carry the major portion of the weight of said axle, said steady rest comprising a support, a vertical fluid pressure cylinder mounted on said support, a reciprocable piston mounted in said cylinder, a piston rod secured to said piston, a V-block on said rod engageable with the axle, and a pair of guide rods secured to and arranged at opposite sides of said piston rod in parallel relation, said guide rod being guided in said support.

19. In a machine for grinding railway car axles having a rotatable head and a grinding wheel eccentrically mounted on said head, means for raising the axle to be ground into axial alignment with said head, said means comprising a pair of spaced vertical cylinders, pistons reciprocably mounted in said cylinders, piston rods secured to said pistons, V-blocks on said piston rods for engaging the axles, fluid pressure means for actuating said pistons in said cylinders, and means for causing simultaneous movement of said pistons and for preventing movement of one of said pistons relative to the other.

20. The combination in a car axle grinding machine having a rotatable head and a grinding wheel eccentrically mounted on said head, of a pair of spaced vertically movable V-block supports engageable with the axle to raise the same into axial alignment with said head, centering members engageable with the ends of the axle while said supports are holding said axle in aligned position with said head, and a vertically movable steady rest engageable with the axle midway between its ends for carrying the major portion of the weight of the axle, said V-block supports being disengageable from said axle after said steady rest is in supporting position.

21. In a machine for grinding railway car axles having a rotatable head and a grinding wheel eccentrically mounted on said head, means for raising the axle to be ground into axial alignment with said head, said means comprising a pair of spaced vertical cylinders, pistons reciprocably mounted in said cylinders, piston rods secured to said pistons, V-blocks on said piston rods for engaging the axles, fluid pressure means for actuating said pistons in said cylinders, and means for causing simultaneous movement of said pistons and for preventing movement of one of said pistons relative to the other, said means comprising vertically guided rack members carried by said V-blocks, a rotatable shaft, and gears rigidly secured to said shaft and meshing with said rack members.

22. In a car axle grinding machine, a supporting bed, a carriage arranged for reciprocation on said bed, an annular bearing member extending vertically from said carriage, said member having a circumferential passageway therein and circumferentially arranged ports in one lateral wall thereof communicating with said passage, a head rotatably mounted in said bearing member and having an opening therein registerable with the ports of said members during rotation of said head, a rotatable grinding wheel eccentrically mounted on said head and being bodily movable toward the axis of said head, and a grinding fluid nozzle carried by said rotatable head and arranged to discharge grinding fluid substantially to the line of contact between said grinding wheel and the axle surface being ground during movement of said grinding wheel about said surface.

23. In a car axle grinding machine, a supporting bed, a carriage mounted for reciprocation on said bed, a relatively large annular bearing member arranged on said carriage, a rotatable head mounted for rotation in said bearing member, a rotatable grinding wheel spindle eccentrically mounted on said head, a rotatable member mounted in said head and having a driving connection with said shaft, a support mounted on said carriage, an electric motor mounted on said support, a rotatable drive member mounted on said support having a driving connection with said motor and with said rotatable member, whereby said rotatable member may move about said drive member as an axis, drive gearing for rotating said head, and a driving connection between said motor and gearing.

24. In a car axle grinding machine, a supporting bed, a carriage mounted for reciprocation on said bed, a relatively large annular bearing member arranged on said carriage, a rotatable head mounted for rotation in said bearing member, a rotatable grinding wheel spindle eccentrically mounted on said head, a rotatable member mounted in said head and having a driving connection with said shaft, a support mounted on said carriage, an electric motor mounted on said support, a rotatable drive member mounted on said support having a driving connection with said motor and with said rotatable member, whereby said rotatable member may move about said drive member as an axis, drive gearing for rotating said head, and a driving connection between said motor and gearing, said gearing having speed changing mechanism for changing the speed of rotation of said head during rotation of said grinding wheel spindle.

25. A machine for grinding railway car axles comprising a bed, means on said bed intermediate the ends thereof for rigidly supporting the axle to be ground, and means at the end of said bed for simultaneously grinding the journal and/or wheel seats of said axle, each said means comprising a reciprocable carriage, a relatively large annular bearing member mounted on said carriage, a rotatable head mounted within said bearing member, a rotatable shaft eccentrically mounted in said head and having bracket arms thereon, a grinding wheel spindle mounted for rotation in said arms and having a grinding wheel thereon, said bracket arms being movable toward and away from the axis of said head, a single electric motor for rotating said head and said spindle, a change speed mechanism having driving connection with said motor and head, and means independent of said motor for reciprocating said carriage.

In testimony whereof we affix our signatures.

HENRY H. YERK.
ARTHUR A. KOTTMAN.